United States Patent
Gao

(10) Patent No.: US 8,550,440 B2
(45) Date of Patent: Oct. 8, 2013

(54) BUFFER MECHANISM

(75) Inventor: Dong-Wei Gao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 392 days.

(21) Appl. No.: 13/113,077

(22) Filed: May 23, 2011

(65) Prior Publication Data
US 2012/0061891 A1 Mar. 15, 2012

(30) Foreign Application Priority Data
Sep. 10, 2010 (CN) .......................... 2010 1 0278426

(51) Int. Cl.
*F16F 13/02* (2006.01)
(52) U.S. Cl.
USPC ..................................... 267/140.13; 267/137
(58) Field of Classification Search
USPC ................. 267/195, 201, 202, 205, 209, 259, 267/140.11, 140.13, 137; 248/562, 565
See application file for complete search history.

(56) References Cited

U.S. PATENT DOCUMENTS

| 1,073,161 A * | 9/1913 | O'Conner .................. 267/209 |
| 3,696,891 A * | 10/1972 | Poe ............................ 188/268 |
| 4,595,167 A * | 6/1986 | Tangorra et al. ........... 248/638 |
| 7,234,569 B2 * | 6/2007 | Salice ......................... 188/130 |

FOREIGN PATENT DOCUMENTS

| CN | 2163781 Y | 5/1994 |
| CN | 101758501 A | 6/2010 |

* cited by examiner

*Primary Examiner* — Anna Momper
(74) *Attorney, Agent, or Firm* — Altis & Wispro Law Group, Inc.

(57) ABSTRACT

A mechanism to act as a buffer, the mechanism includes a base seat defining a chamber and a bottom hole communicating with the chamber; a connecting shaft received in the chamber and extending through the bottom hole, the connecting shaft including a blocking portion for preventing detachment from the base seat, the connecting shaft axially defining a receiving hole and a plurality of mounting holes communicating with the receiving hole; a guiding rod fixed to the base seat, one end of the guiding rod extending out of the base seat and an inserting portion at the other end, the inserting portion including an abutting surface tapered toward the distal end; a buffer sleeved on the connecting shaft; a plurality of rolling bodies in the mounting holes and providing resistance between the abutting surface and the buffer; and a resilient member between the guiding rod and the blocking portion.

17 Claims, 5 Drawing Sheets

BUFFER MECHANISM

BACKGROUND

1. Technical Field

The present disclosure relates to a buffer mechanism, and more particularly, to a buffer mechanism for absorbing energy created by collisions between workpieces.

2. Description of Related Art

A workpiece may be clutched or moved by a manipulator arm in a mechanical manufacturing process such as computer numerical control (CNC) process. The manipulator arm is generally moved along a predetermined path to realize automatic loading or unloading. There is a plurality of pins fixed on the CNC machine, and the workpiece defines pinholes corresponding to the pins on the CNC machine. The workpiece is moved by the manipulator arm toward the CNC machine, and then the pins engage in the pinholes correspondingly, such that, the workpiece is accurately positioned on the CNC machine. However, there may be manufacturing inaccuracies in the pins and the pinholes and along with any positional inaccuracy in the manipulator arm, there may be stiffness between the pins and the workpiece, and, at worst, deformation or chipping damage caused either to the workpiece or the pins or both.

Therefore, there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the buffer mechanism. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
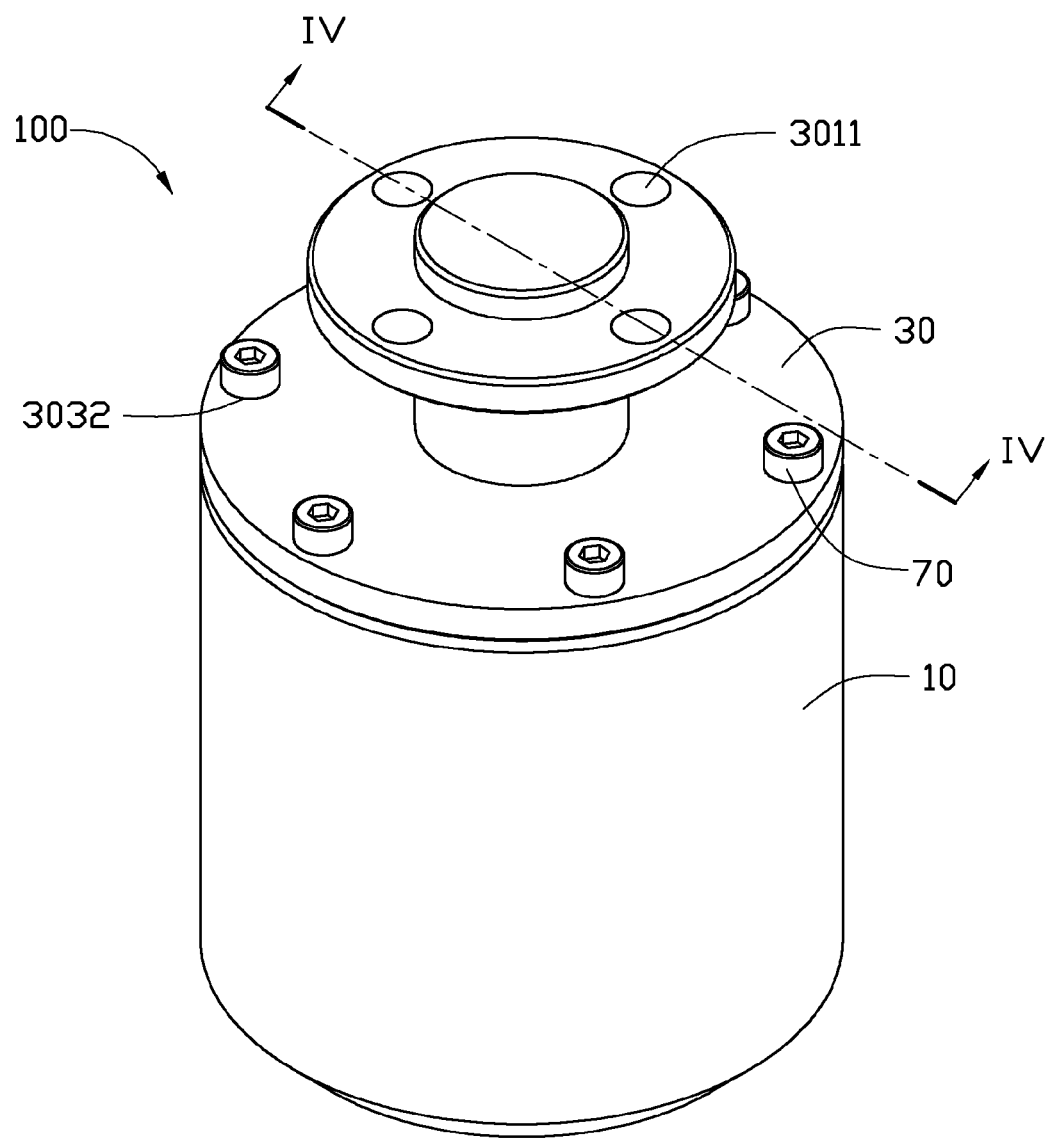
FIG. 1 is an assembled, isometric view of an embodiment of a buffer mechanism.
Figure 2:
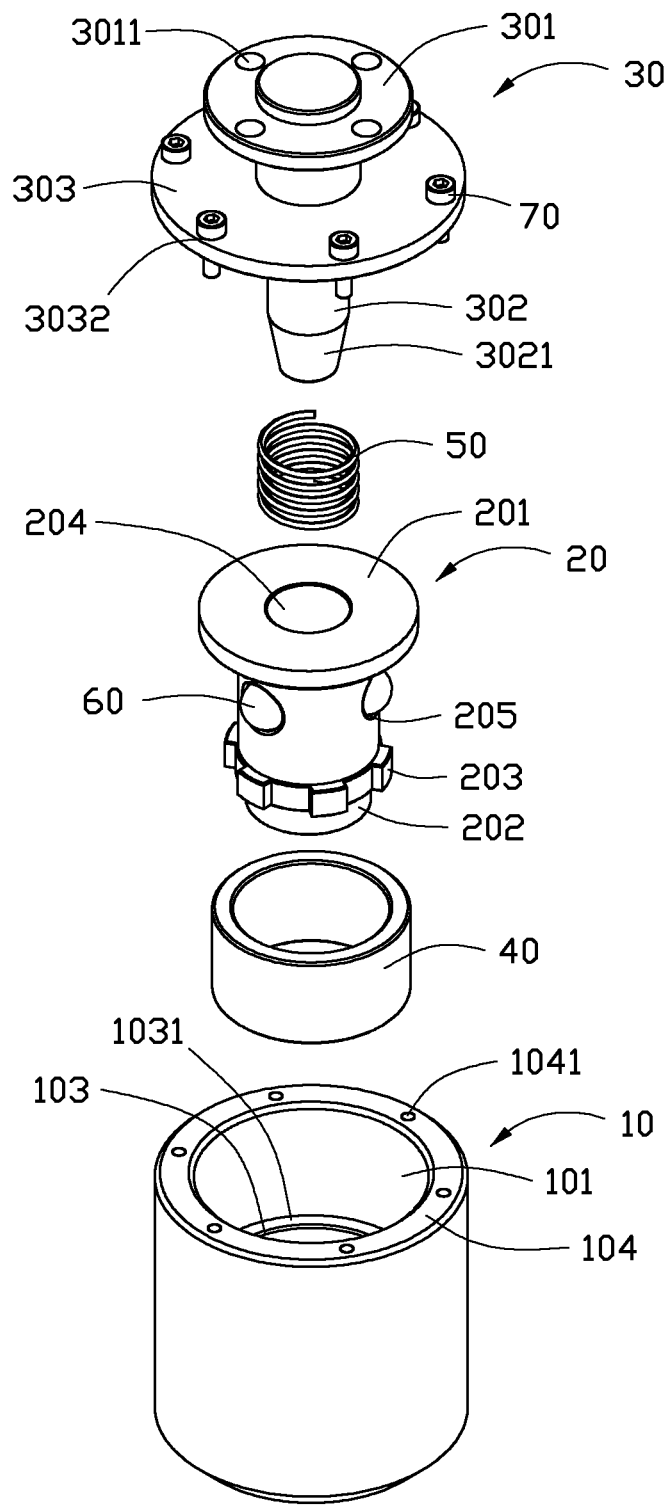
FIG. 2 is an exploded, isometric view of the buffer mechanism shown in FIG. 1.

Referring to FIGS. 1 and 2, an embodiment of a buffer mechanism 100 includes a base seat 10, a connecting shaft 20, a guiding rod 30, a buffer 40, a resilient member 50 and a plurality of rolling bodies 60. The guiding rod 30 is fixed to the base seat 10. The connecting shaft 20, the buffer 40, the resilient member 50 and the rolling bodies 60 are received in the base seat 10.

Figure 3:
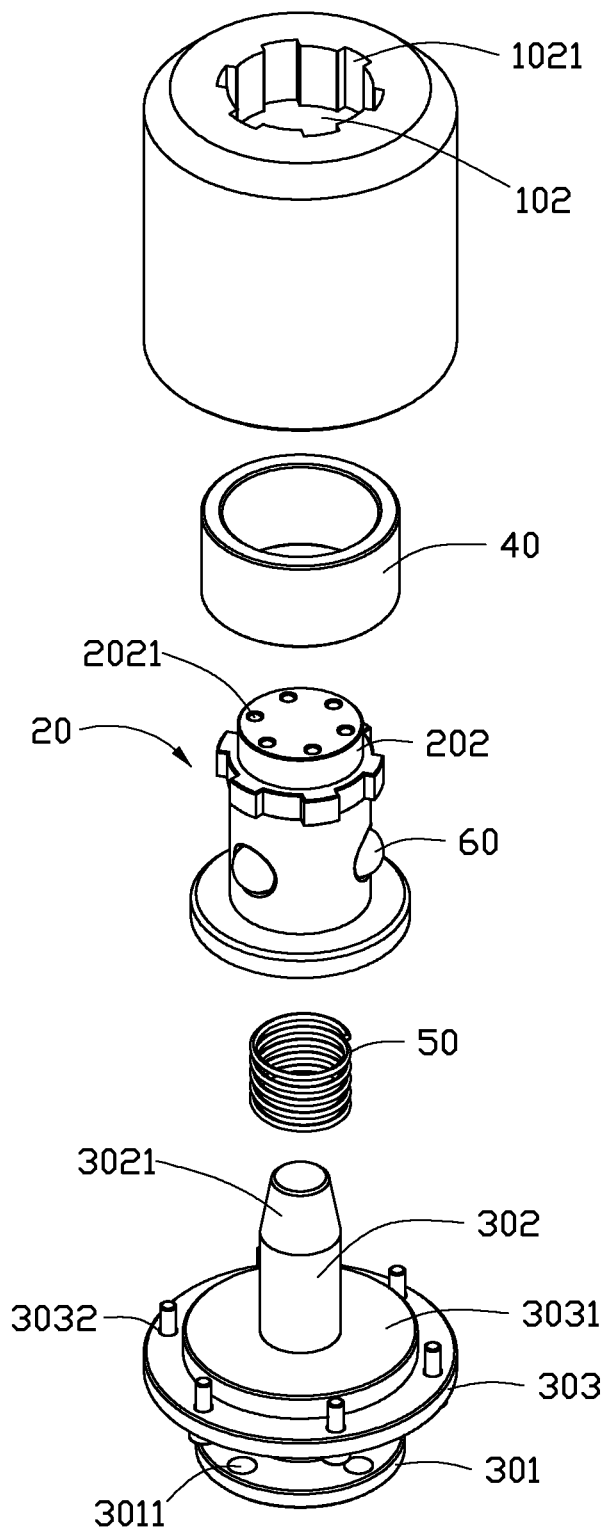
FIG. 3 is similar to FIG. 1, but viewed from another aspect.

Also referring to FIG. 3, the base seat 10 defines a chamber 101 and a bottom hole 102 communicating with the chamber 101. The base seat 10 forms a shoulder 103 and an annular end surface 104 at opposite ends of the chamber 101. The bottom hole 102 is circular, and the sidewall of the bottom hole 102 defines a plurality of key grooves 1021. The shoulder 103 is located adjacent to the bottom hole 102 and forms a blocking surface 1031. The annular end surface 104 is located at the distal end away from the bottom hole 102 and defines a plurality of threaded holes 1041.

The connecting shaft 20 includes a blocking portion 201 at one end, a connecting portion 202 at the other end, and a splined portion 203 positioned between them. The blocking portion 201 is substantially annular in shape and abuts the shoulder 103, such that the connecting shaft 20 is supported by the shoulder 103. The connecting portion 202 is capable of extending through the bottom hole 12 and is used for fixing clamps. The connecting shaft 20 axially defines a receiving hole 204 and a plurality of mounting holes 205 communicating with the receiving hole 204. The mounting holes 205 are distributed circumferentially on the connecting shaft 20 between the blocking portion 201 and the splined portion 203 and house the rolling bodies 60. The end surface of the connecting portion 202 defines a plurality of threaded holes 2021 arranged circumferentially. The plurality of threaded holes 2021 is used for fixing a workpiece. The splined portion 203 includes a plurality of splines (not labeled) to engage with the plurality of key grooves 1021.

The guiding rod 30 includes a first flange 301 at a first end, an inserting portion 302 at a second end opposite to the first end, and a second flange 303 positioned between the first flange 301 and the inserting portion 302. The first flange 301 defines a plurality of holes 3011 for fixing a manipulator arm. The second flange 303 is parallel to the first flange 301 and includes a positioning stage 3031 facing the inserting portion 302. The positioning stage 3031 is circular. The second flange 303 defines a plurality of holes 3032 which are located axially with the threaded holes 1041. The inserting portion 302 includes an abutting surface 3021. In the embodiment, the inserting portion 302 has an inverted frusto-cone shape. The abutting surface 3021 surrounds the inserting portion 302. It is to be understood that the abutting surface 3021 may be a curved surface tapered toward the second end along the axis of the guiding rod 30.

In the embodiment, the buffer 40 is substantially annular-shaped and made of rubber or other resilient material. It is to be understood that the buffer 40 may have other shapes, such as arc-shaped surrounding the connecting shaft 20 and made of compound or composite materials.

In the embodiment, the resilient member 50 is a helical compression spring. It is to be understood that the resilient member 50, while made of elastic material, may be of other shapes and operate in different ways as a spring.

In the embodiment, the rolling bodies 60 are rolling balls, they may also be a plurality of cylindrical members.

Referring to FIGS. 2 and 3 again, when assembling the buffer mechanism, the buffer 40 is received in the chamber 101 of the base seat 10 with its outer surface tightly abutting the inner surface of the base seat 10. The buffer 40 is then positioned adjacent to the shoulder 103. The rolling bodies 60 are mounted in the mounting holes 205 of the connecting shaft 20, and then the connecting shaft 20 with the rolling bodies 60 is received in the base seat 10 and the connecting portion 202 extends through the bottom hole 102 of the base seat 10. Thereby, the blocking portion 201 of the connecting shaft 20 detachably abuts the blocking surface 1031 of the shoulder 103, thus the blocking surface 1031 is capable of moving away from the blocking surface 1031 toward the second flange 303 as necessary. The splines of the splined portion 203 engage in the key grooves 1021 to non-rotatably connect the connecting shaft 20 with the base seat 10. It is to be understood that flat keys may be substituted for the splines in the splined portion 203, thus the key grooves 1021 should be changed to flat key grooves correspondingly. Then, the buffer 40 is sleeved on the outer surface (not shown) of the connecting shaft 20, the buffer 40 is received in a space cooperatively defined by the blocking portion 201, the shoulder 103, the connecting shaft 20 and the base seat 10. Thereby, the buffer 40 prevents the dislocation of the rolling bodies 60 from the mounting hole 205. The resilient member 50 is then sleeved on the inserting portion 302 of the guiding rod 30, and then the guiding rod 30 is received in the receiving hole 204 with the abutting surface 3021 acting to prevent the dislocation of the rolling bodies 60 from the mounting holes 205. The second flange 303 is positioned on the end surface 104 of the base seat 10, a plurality of screws 70 extends through the holes 3032 to engage with the threaded holes 1041, so as to fix the guiding rod 30 to the base seat 10. At the same time, the first flange 301 extends out of the base seat 10. The peripheral surface (not labeled) of the positioning stage 3031 abuts the inner surface (not labeled) of the chamber 101 to seal the chamber 101. The resilient member 50 is contained between the blocking portion 201 of the connecting 20 and the second flange 203 of the guiding rod 30, and the connecting shaft 20 is capable of compressing the resilient member 50 to move toward the second flange 303.

Figure 4:
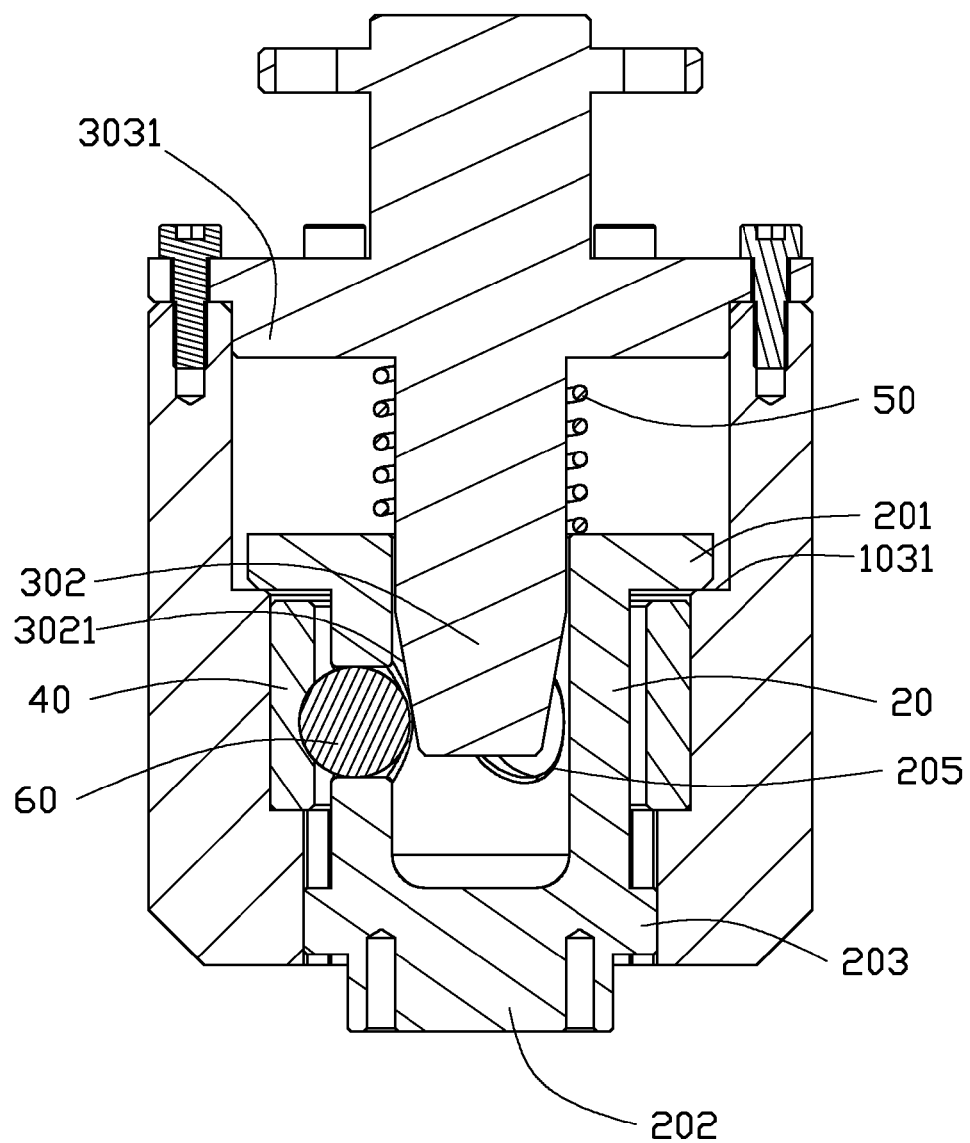
FIG. 4 is a cross sectional of the buffer mechanism taken along line IV-IV of FIG. 1.

Referring to FIG. 4, in use, when the buffer mechanism 10 is in a first state, the connecting portion 202 of the connecting shaft 20 is connected to a workpiece (not shown), and the connecting shaft 20 can rotate together with the base seat 10 and the workpiece. When the workpiece is hit by an object such as pins, it drives the connecting shaft 20 to move toward the second flange 303 of the guiding rod 30, then the blocking portion 201 moves toward the second flange 303 and resists the resilient member 50, so the rolling bodies 60 move along the abutting surface 3021 of the inserting portion 302. Because the abutting surface 3021 tapers toward the second end along the axis of the guiding rod 30, the rolling bodies 60 move not only longitudinally but also transversally, thus the rolling bodies 60 cooperatively tend to resist the abutting surface 3021 and the buffer 40. As a result of the buffer action of the buffer 40, the rolling body 60 will not be damaged by the abutting surface 3021. The resistance on the rolling bodies 60 from the abutting surface 3021 will increase as the connecting shaft 20 moves toward the second flange 303. Thus, a second state of the buffer mechanism 10 is achieved.

Figure 5:
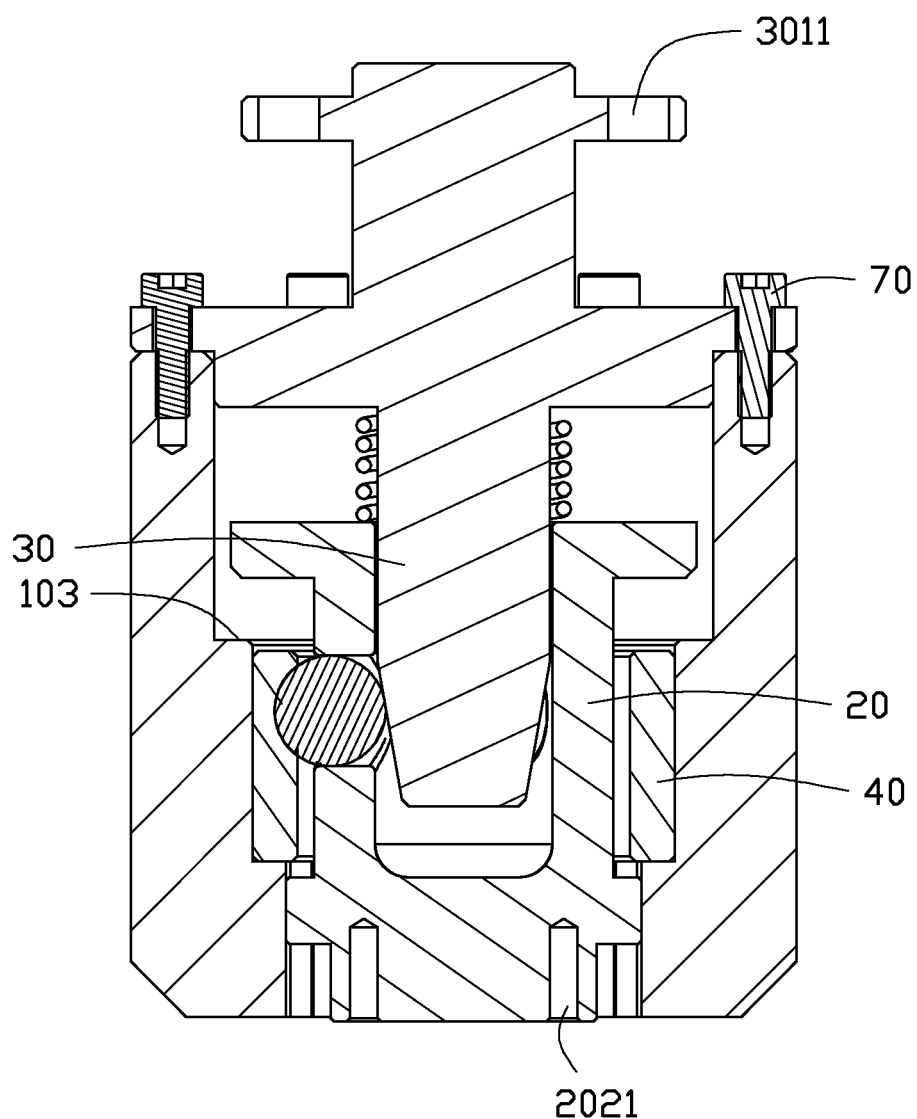
FIG. 5 is similar to FIG. 4, but shows another state of the buffer mechanism.

Referring to FIG. 5, when the buffer mechanism 10 reaches a second state, the rolling bodies 60 will be at the beginning end of the inserting portion 302 when the abutting surface 3021 and the buffer 40 are pressed by the rolling bodies 60 to a maximum position. The connecting shaft 20 will be jammed by the rolling bodies 60, and at the same time the resilient member 50 will be under maximum compression.

Potential energy is concentrated in the resilient member 50 in the process of the mechanism 10 transitioning from the first state to the second state. So, the resilient member 50 will release the potential energy and drive the connecting shaft 20 away from the second flange 303 through the resistance of the resilient member 50 against the blocking portion 201. And then the buffer 40 will release the potential energy and push the rolling bodies 60 away from the second flange 303 at an angle. The abutting surface 3021 will resist the rolling bodies 60 at the same time. The resisting force focused on the rolling bodies 60 from the buffer 40 and the abutting surface 3021 drives the rolling bodies 60 away from the second flange 303 along the axis of the connecting shaft 20. Thus the connecting shaft 20 will move toward the bottom hole 102 until the blocking portion 201 abuts the blocking surface 1031 of the shoulder 103, such that, the rolling bodies 60, the resilient member 50, and the buffer 40 return to their starting positions, and then the mechanism 10 will have returned to the first state.

It is to be understood that the buffer 40 may be omitted if the inner surface of the base seat 10 is elastic.

It is to be understood, however, that even through numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A buffer mechanism, comprising:
   a base seat defining a chamber and a bottom hole communicating with the chamber;
   a connecting shaft received in the base seat and one end of the connecting shaft extending through the bottom hole, and the connecting shaft comprising a blocking portion received in the chamber for preventing the connecting shaft detaching from the base seat, the connecting shaft defining a receiving hole axially and a plurality of mounting holes communicating with the receiving hole;
   a guiding rod fixed to the base seat, the guiding rod comprising a first end extending out of the base seat and an inserting portion formed at a second end opposite to the first end, the inserting portion being received in the receiving hole and comprising an abutting surface tapered toward the second end;
   a buffer sleeved on the connecting shaft within the base seat;
   a plurality of rolling bodies mounted in the mounting holes and resisted between the abutting surface and the buffer; and
   a resilient member resisted between the guiding rod and the blocking portion.

2. The buffer mechanism of claim 1, wherein the guiding rod further comprises a first flange at the first end, and a second flange positioned between the first flange and the inserting portion, the second flange is parallel to the first flange and fixed to the base seat.

3. The buffer mechanism of claim 2, wherein the resilient member is sleeved on the guiding rod and positioned between the second flange and the blocking portion.

4. The buffer mechanism of claim 1, wherein the inserting portion has an inverted frusto-cone shape, the abutting surface surrounds the inserting portion and is tapered along the axis of the inserting portion.

5. The buffer mechanism of claim 1, wherein the connecting shaft comprises a connecting portion at an end away from the blocking portion used for fixing a workpiece.

6. The buffer mechanism of claim 5, wherein the connecting shaft further comprises a splined portion positioned between the blocking portion and the connecting portion, the splined portion comprises a plurality of splines, an inner sidewall of the bottom hole defines a plurality of key grooves therein, the splines engage in the key grooves respectively to non-rotatably connect the connecting shaft and the base seat.

7. A buffer mechanism, comprising:
   a base seat defining a chamber and a bottom hole communicating with the chamber, the base seat comprising a shoulder adjacent to the bottom hole;
   a connecting shaft received in the base seat and one end of the connecting shaft extending through the bottom hole, and the connecting shaft comprising a blocking portion resisting the shoulder for preventing the connecting shaft detaching from the base seat, the connecting shaft defining a receiving hole axially and a plurality of mounting holes communicating with the receiving hole;

a guiding rod fixed to the base seat, the guiding rod comprising a first end extending out of the base seat and an inserting portion formed at a second end opposite to the first end, the inserting portion being received in the receiving hole and comprising an abutting surface tapered toward the second end;

a buffer positioned between the outer surface of the connecting shaft and the inner surface of the base seat;

a plurality of rolling bodies mounted in the mounting holes and resisted between the abutting surface and the buffer; and a resilient member resisted between the guiding rod and the blocking portion.

8. The buffer mechanism of claim 7, wherein the buffer is an annular-shaped rubber sleeved on the connecting shaft, the inner and outer surfaces of the buffer are resisted on the connecting shaft and the shoulder respectively.

9. The buffer mechanism of claim 7, wherein the connecting shaft comprises a connecting portion at the end away from the blocking portion used for fixing a workpiece.

10. The buffer mechanism of claim 7, wherein the guiding rod comprises a first flange at the first end, and a second flange positioned between the first flange and the inserting portion, the second flange is parallel to the first flange and fixed to the base seat.

11. The buffer mechanism of claim 10, wherein the resilient member is sleeved on the guiding rod and is resisted between the second flange and the blocking portion.

12. The buffer mechanism of claim 11, wherein the connecting shaft further comprises a splined portion between the blocking portion and the connecting portion, the splined portion comprises a plurality of splines, an inner sidewall of the bottom hole defines a plurality of key grooves therein, the splines engage in key grooves respectively to non-rotatably connect the connecting shaft and the base seat.

13. A buffer mechanism, comprising:

a base seat defining a chamber and a bottom hole communicating with the chamber;

a connecting shaft received in the base seat and one end of the connecting shaft extending through the bottom hole, the connecting shaft comprising a blocking portion received in the chamber for preventing the connecting shaft detaching from the base seat, the connecting shaft defining a receiving hole axially and a plurality of mounting holes communicating with the receiving hole;

a guiding rod fixed to the base seat, the guiding rod comprising a first end extending out of the base seat and an inserting portion formed at a second end opposite to the first end, the inserting portion being received in the receiving hole and comprising an abutting surface tapered toward the second end;

a plurality of rolling bodies mounted in the mounting holes and resisted between the abutting surface and the base seat; and a resilient member resisted between the guiding rod and the blocking portion to prevent the inserting portion detaching from the receiving hole.

14. The buffer mechanism of claim 13, wherein buffer mechanism further comprises a buffer in annular-shape, the buffer is sleeved on the connecting shaft within the base seat, the rolling bodies are resisted between the abutting surface and the buffer.

15. The buffer mechanism of claim 13, wherein the inserting portion has an inverted frusto-cone shape, the abutting surface surrounds the inserting portion and is tapered along the axis of the connecting shaft.

16. The buffer mechanism of claim 13, wherein the connecting shaft comprises a connecting portion at the end away from the blocking portion used for fixing a workpiece.

17. The buffer mechanism of claim 13, wherein the guiding rod comprises a first flange at the first end, and a second flange positioned between the first flange and the inserting portion, the second flange is parallel to the first flange and fixed to the base seat.

* * * * *